US 6,619,358 B2

(12) United States Patent
Murphy

(10) Patent No.: US 6,619,358 B2
(45) Date of Patent: Sep. 16, 2003

(54) METHOD AND SYSTEM FOR BONDING PLASTIC PARTS TOGETHER

(75) Inventor: John F. Murphy, Imlay City, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 09/796,886

(22) Filed: Feb. 28, 2001

(65) Prior Publication Data

US 2001/0010251 A1 Aug. 2, 2001

Related U.S. Application Data

(62) Division of application No. 09/305,515, filed on May 5, 1999.

(51) Int. Cl.[7] ............................................. B32B 31/00
(52) U.S. Cl. ..................... 156/359; 156/378; 156/380.9
(58) Field of Search ............................. 156/380.9, 378, 156/379.8, 359, 64

(56) References Cited

U.S. PATENT DOCUMENTS

| | | |
|---|---|---|
| 3,383,265 A | 5/1968 | Garabedian |
| 3,549,451 A | 12/1970 | Kugler |
| 4,096,306 A | 6/1978 | Larson |
| 4,265,954 A | 5/1981 | Romanek |
| 4,715,923 A * | 12/1987 | Knoll ..................... 156/380.9 |
| 4,906,320 A * | 3/1990 | Powers ..................... 156/379.8 |
| 5,062,661 A | 11/1991 | Winget |
| 5,151,149 A | 9/1992 | Swartz |
| 5,228,108 A | 7/1993 | Motev et al. |
| 5,244,525 A | 9/1993 | Neuwirth |
| 5,399,819 A | 3/1995 | Lang et al. |
| 5,444,814 A | 8/1995 | Hofius |
| 5,465,998 A | 11/1995 | Davis |
| 5,486,252 A | 1/1996 | Wong |
| 5,487,557 A | 1/1996 | Eckhout |
| 5,520,412 A | 5/1996 | Davis |
| 5,522,954 A | 6/1996 | Bennett et al. |
| 5,542,694 A | 8/1996 | Davis |
| 5,549,323 A | 8/1996 | Davis |
| 5,558,364 A | 9/1996 | Davis |
| 5,642,901 A | 7/1997 | Bowman et al. |
| 5,685,561 A | 11/1997 | Kauer |
| 5,743,408 A | 4/1998 | Hill |
| 5,743,982 A | 4/1998 | Marfilius et al. |
| 5,750,970 A | 5/1998 | Chaffin |
| 5,760,379 A | 6/1998 | Matsen et al. |
| 5,840,147 A | 11/1998 | Grimm |
| 5,858,159 A | 1/1999 | Holbrook et al. |

* cited by examiner

Primary Examiner—Michael W. Ball
Assistant Examiner—Todd J Kilkenny
(74) Attorney, Agent, or Firm—Brooks & Kushman P.C.

(57) ABSTRACT

A method and system for bonding plastic parts together utilizing a heat-activated adhesive and at least one infrared lamp are disclosed. The system preferably includes first and second infrared lamps for emitting infrared radiation. A first base section supports a first infrared lamp adjacent the first plastic part and a second base section supports the second infrared lamp adjacent the second plastic part. The system also includes a controller coupled to the first and second infrared lamps for controlling power supplied to the first and second infrared lamps so that the first infrared lamp emits infrared radiation which propagates through the first plastic part and is absorbed by the adhesive and the second infrared lamp emits infrared radiation which propagates through the second plastic part and is absorbed by the adhesive for a time sufficient to heat the adhesive to a desired temperature at which the adhesive is activated.

12 Claims, 1 Drawing Sheet

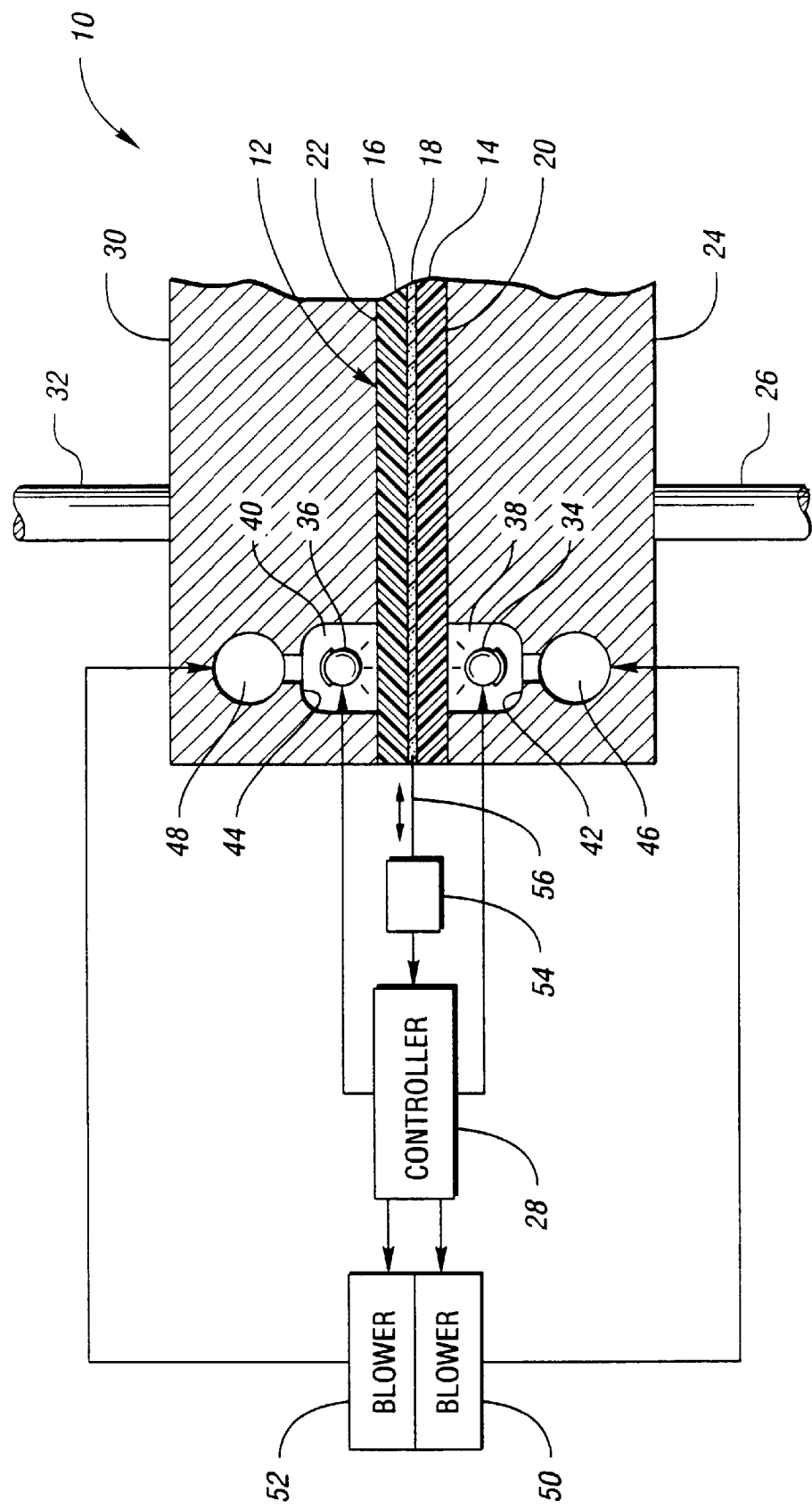

METHOD AND SYSTEM FOR BONDING PLASTIC PARTS TOGETHER

CROSS REFERENCE TO RELATED APPLICATION

This is a divisional of copending application(s) Ser. No. 09/305,515 filed on May 5, 1999.

This application is related to U.S. patent application entitled "Method and System For Manufacturing An Air Bag Cover Assembly Including A Switch" filed on the same date as this application and having U.S. Ser. No. 09/305,531. This application is a divisional patent application to U.S. Ser. No. 09/305,515, now U.S. Pat. No. 6,251,202.

TECHNICAL FIELD

This invention relates to methods and systems for bonding plastic parts together and, more particularly, to methods and systems for bonding plastic parts together utilizing infrared radiation.

BACKGROUND ART

When one wishes to attach plastic parts together, several processes exist to accomplish this. Among them are methods such as hot air bonding, sonic welding, vibration welding, adhesives, mechanical fasteners and infrared radiant heat.

U.S. Pat. No. 5,750,470 discloses a method of dielectrically heating an adhesive which, in turn, bonds plastic parts together.

Infrared radiant heat has certain advantages over the other types of processes. Generally, there is a desire to form a strong bond between the two parts quickly at a minimal cost. Additionally, it is preferable that during the bonding process nothing touches the surfaces to be bonded in order to assure uniform bonds from part-to-part and to reduce the cost of cleaning the bonding apparatus. Further, in many instances, it is preferable that no marring or distortion occur on the surface opposite the surface which is bonded. This surface is referred to as the "viewing" or "class A" surface.

Infrared bonding, in general, can overcome many of these concerns. Infrared energy can be finitely pinpointed with a focal point or a mask to the exact area to be bonded in order to avoid overheating the plastic in adjacent areas that might cause unwanted distortion in the part. Infrared energy can heat the bonding surface to a high temperature, thus assuring that a strong bond is formed between the two parts. The bonding surface can be heated very quickly with infrared energy and the timing and amount of heat application can be precisely controlled. Further, with infrared heating, there need be no contact between the heat source and the bonding surfaces of the parts, in order to minimize cleaning requirements for the tooling.

Nonetheless, there are some drawbacks, in general, to using infrared heat to bond plastic parts together. In the case of automotive interior parts, for example, there are many parts made of plastic that are bonded to another part, but also need to have their viewing surfaces as distortion and mar free as possible since occupants of the vehicle will be able to see the surfaces. However, in the general application of focused infrared heat on the bonding surface in such applications, the "class A" surface is oftentimes damaged. The finite focal point, while avoiding overheating adjacent areas, is too intense and harms many plastic parts during the heating process. An inherent difficulty to overcome in working with infrared radiant heat to bond plastic is to heat the bonding surfaces sufficiently without causing warpage, burning or marring of the "class A" surfaces.

U.S. Pat. Nos. 3,383,265; 3,549,451; 4,265,954; 5,151,149; 5,244,525; 5,444,814 and 5,522,954 all disclose the use of infrared energy to bond or join plastic or polymeric materials together. The '954 patent discloses the bonding of plastic interior automatic parts having "class A" surfaces after each surface is exposed to infrared heat from an infrared heat source positioned between the surfaces.

U.S. Pat. No. 4,096,306 discloses a method of forming air-inflated cushioning material using two heat sealable films with air passages therebetween, which may be fused by "infrared black line sealing."

One prior art bonding process used hot air to activate a relatively expensive heat-activated adhesive. However, the use of hot air: 1) has a relatively long cycle time; 2) requires a relatively expensive heat-activated adhesive; and 3) requires a relatively large initial capital investment which equipment is relatively expensive to maintain.

The use of heat-activated adhesive to bond parts together is shown by the following U.S. Pat. Nos.: 5,228,108; 5,743,982; 5,486,252; 5,858,159; and 5,743,408.

DISCLOSURE OF INVENTION

An object of the present invention is to provide a method and system for bonding plastic parts together quickly and inexpensively without introducing deformities into the resulting assembly.

Another object of the present invention is to provide a method and system for bonding plastic parts together using infrared radiation which activates a heat-activated adhesive therebetween after propagating through at least one of the plastic parts.

Yet another object of the present invention is to provide a method and system for bonding plastic parts together wherein the bonds are quickly and inexpensively formed in a controlled fashion using infrared radiation which activates a heat-activated adhesive applied on an inner surface of at least one of the plastic parts.

In carrying out the above objects and other objects of the present invention, a method of bonding plastic parts together is provided. The method includes providing first and second plastic parts, applying a heat-activated adhesive on at least one inner surface of the plastic parts, positioning the plastic parts so that adhesive is located between inner surfaces of the plastic parts, and directing infrared radiation at the first plastic part so that the infrared radiation propagates through the first plastic part and is absorbed by the adhesive for a time sufficient to heat the adhesive to a desired temperature at which the adhesive is activated. The method also includes controlling the amount of heat applied to the adhesive by the infrared radiation. The activated adhesive bonds the plastic parts together.

Preferably, the method further includes the step of cooling the first plastic part. The step of cooling includes the step of blowing air at the first plastic part.

Also, preferably, the method further includes the step of generating a feedback signal based on the temperature of the adhesive wherein the step of controlling is based on the feedback signal.

Further in carrying out the above objects and other objects of the present invention, a system for bonding first and second plastic parts having a heat-activated adhesive located therebetween is provided. The system includes a first infrared lamp for emitting infrared radiation, a first base section for supporting the first infrared lamp adjacent the first plastic part, and a controller coupled to the first infrared lamp for controlling power supplied to the first infrared lamp so that the first infrared lamp emits infrared radiation which propagates through the first plastic part and is absorbed by the adhesive for a time sufficient to heat the adhesive to a desired temperature at which the adhesive is activated. The activated adhesive bonds the plastic parts together.

Preferably, the system further includes a first blower coupled to the controller for selectively supplying and interrupting a flow of forced air to the first plastic part to cool the first plastic part.

Also, preferably, the system further includes a temperature sensor coupled to the controller for sensing the temperature of the adhesive. The controller is responsive to the temperature sensor for controlling the power supplied to the first infrared lamp.

The first base section may have a first cavity formed therein in which the first infrared lamp is received and retained. A first cavity wall which defines the first cavity directs infrared radiation emitted by the first infrared lamp towards the first plastic part. The first base section may have a passage formed therein in fluid communication with the first cavity for conveying a flow of cooling air into the first cavity.

Still further in carrying out the above objects and other objects of the present invention, another system for bonding first and second plastic parts having a heat-activated adhesive located therebetween is provided. The system includes first and second infrared lamps for emitting infrared radiation. A first base section supports the first infrared lamp adjacent the first plastic part and a second base section supports the second infrared lamp adjacent the second plastic part. The system further includes a controller coupled to the first and second infrared lamps for controlling power supplied to the first and second infrared lamps so that the first infrared lamp emits infrared radiation which propagates through the first plastic part and is absorbed by the adhesive and the second infrared lamp emits infrared radiation which propagates through the second plastic part and is absorbed by the adhesive for a time sufficient to heat the adhesive to a desired temperature at which the adhesive is activated. The activated adhesive bonds the plastic parts together.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a side schematic view, partially broken away and in cross-section, of a system of the present invention for bonding plastic parts together.

BEST MODE FOR CARRYING OUT THE INVENTION

Referring now to FIG. 1, there is illustrated a system, generally indicated at 10, for bonding plastic parts together to form an assembly 12, generally indicated at 12, of plastic parts. The assembly 12 includes a first plastic part 14, a second plastic part 16, and a heat-activated adhesive 18 applied on an inner surface 20 of the first plastic part 14. The adhesive 18 may also be applied to an inner surface 22 of the second plastic part 16.

The parts 14 and 16 may be injection molded, RIM, SMC or BMC plastic parts.

As illustrated in FIG. 1, the system 10 includes a first base section 24 which may take the form of a fixture mounted for movement with a rod 26 of an air cylinder (not shown) under control of a controller 28.

The system 10 may include a second base section 30 which may also take the form of a fixture mounted for movement with a rod 32 of another air cylinder (not shown) also under control of the controller 28. The controller 28 may be a programmable controller or a microprocessor-based controller. The controller 28 may have stored therein data which represents various times and sequential events for use in controlling the various devices described herein. For example, time data may be stored therein based on the amount of time and power for energizing infrared lamps described hereinbelow.

The base sections 24 and 30 may be adapted to receive and retain one infrared energy source in the form of infrared emitting lamps 34 and 36, respectively. The lamps 34 and 36 emit energy or radiation which propagates through the first and second plastic parts 14 and 16, respectively, for a time sufficient to heat the infrared-absorbing adhesive 18 to a desired temperature at which the adhesive is activated.

The lamps 34 and 36 are fixedly mounted within cavities 38 and 40, respectively, formed within the base sections 24 and 30, respectively. Walls 42 and 44 which define the cavities 38 and 40, respectively, help direct infrared radiation toward the first and second plastic parts 14 and 16, respectively.

The base sections 24 and 30 also preferably include channels 46 and 48, respectively, in fluid communication with their respective cavities 38 and 40 for conveying a flow of cooling air into their respective cavities 38 and 40 and then against their respective parts 14 and 16. The flow of cooling air may be provided by blowers 50 and 52 to the channels 46 and 48, respectively. The blowers 50 and 52 are controlled by the controller 28 to selectively supply and interrupt a flow of forced, cooling air to the parts 14 and 16.

The control system provided by the controller 28 may be a closed-loop control system by including a temperature sensor 54 having a movable wire sensing element 56 which is inserted into the adhesive 18 during adhesive heating to provide a feedback signal based on the temperature of the adhesive. The feedback signal is used by the controller 28 to control the amount of heat applied to the adhesive by the infrared radiation emitted by the lamps 42 and 44. The amount of heat is controlled by the controller 28 by controlling the amount of power supplied to the lamps 42 and 44.

Process of Bonding The Parts Together

1. Initially coat inner surfaces 20 and 22 of the plastic parts 14 and 16, respectively, with the adhesive 18;
2. Optionally, apply pressure via the base sections 24 and 30 to the plastic parts 14 and 16;
3. Energize the lamps 42 and 44 under control of the controller 28;
4. Sense the temperature of the adhesive 18 until the adhesive 18 reaches a desired temperature at which the adhesive 18 is activated;
5. Deenergize the lamps 42 and 44;
6. Turn the blowers 50 and 52 on to cool the lamps 42 and 44 and the first and second parts 14 and 16, respectively;
7. Remove the resulting assembly 12 from between the base sections 24 and 30 after moving the base sections 24 and 30 apart and inspect the assembly 12.

In summary, the heat-activated adhesive 18 is typically applied in liquid form to one or both of the inner surfaces 20 and 22 of the first part 14 and the second part 16, respectively. The infrared radiation from the lamps 42 and 44 travels or propagates through the parts 14 and 16 and is absorbed by the adhesive 18 for a time sufficient to heat the adhesive 18 to a desired temperature at which the adhesive is activated. The adhesive 18, when cooled, fixedly secures or bonds the parts 14 and 16 together. In this way, a much cheaper adhesive than what is conventionally used may be employed to secure or bond the plastic parts 14 and 16 together.

While the best mode for carrying out the invention has been described in detail, those familiar with the art to which this invention relates will recognize various alternative designs and embodiments for practicing the invention as defined by the following claims.

What is claimed is:

1. A system for bonding first and second plastic parts having a liquid heat-activated adhesive located therebetween, the system comprising:
   a first infrared lamp for emitting infrared radiation;
   a first base section for supporting the first and second plastic parts with the liquid adhesive located therebetween and for supporting the first infrared lamp adjacent the first plastic part;
   a temperature sensor having a movable wire sensing element which is inserted into the liquid adhesive during heating, wherein the sensing element provides a feedback signal based on the temperature of the liquid adhesive; and
   a controller coupled to the first infrared lamp for controlling power supplied to the first infrared lamp in response to the feedback signal so that the first infrared lamp emits infrared radiation which propagates through the first plastic part and is absorbed by the liquid adhesive for a time sufficient to heat the liquid adhesive to a desired temperature at which the liquid adhesive is activated wherein the activated adhesive bonds the plastic parts together.

2. The system as claimed in claim 1 further comprising a first blower coupled to the controller for selectively supplying and interrupting a flow of forced air to the first plastic part to cool the first plastic part.

3. The system as claimed in claim 1 wherein the first base section has a first cavity formed therein in which the first infrared lamp is received and retained and wherein a first cavity wall which defines the first cavity directs infrared radiation emitted by the first infrared lamp towards the first plastic part.

4. The system as claimed in claim 3 wherein the first base section has a passage formed therein in fluid communication with the first cavity for conveying a flow of cooling air into the first cavity.

5. The system as claimed in claim 1 wherein the controller is a programmable controller.

6. The system as claimed in claim 1 wherein the controller is a microprocessor-based controller.

7. A system for bonding first and second plastic parts having a liquid heat-activated adhesive located therebetween, the system comprising:
   first and second infrared lamps for emitting infrared radiation;
   a first base section for supporting the first and second plastic parts with the liquid adhesive located therebetween and for supporting the first infrared lamp adjacent the first plastic part and a second base section for supporting the second infrared lamp adjacent the second plastic part when the first and second base sections are together;
   a temperature sensor having a movable wire sensing element which is inserted into the liquid adhesive during heating, wherein the sensing element provides a feedback signal based on the temperature of the liquid adhesive; and
   a controller coupled to the first and second infrared lamps for controlling power supplied to the first and second infrared lamps in response to the feedback signal so that the first infrared lamp emits infrared radiation which propagates through the first plastic part and is absorbed by the liquid adhesive and the second infrared lamp emits infrared radiation which propagates through the second plastic part and is absorbed by the liquid adhesive for a time sufficient to heat the liquid adhesive to a desired temperature at which the liquid adhesive is activated wherein the activated adhesive bonds the plastic parts together.

8. The system as claimed in claim 7 further comprising first and second blowers coupled to the controller for selectively supplying and interrupting flows of forced air to the first and second parts, respectively, to cool the first and second plastic parts.

9. The system as claimed in claim 7 wherein the first base section includes a first cavity formed therein in which the first infrared lamp is received and retained and the second base section includes a second cavity formed therein in which the second infrared lamp is received and retained and wherein walls defining the first and second cavities direct infrared radiation emitted from the first and second infrared lamps, respectively, towards the first and second plastic parts.

10. The system as claimed in claim 9 wherein each of the base sections has a passage formed therein in fluid communication with its cavity for conveying a flow of cooling air into its respective cavity.

11. The system as claimed in claim 7 wherein the controller is a programmable controller.

12. The system as claimed in claim 7 wherein the controller is a microprocessor-based controller.

* * * * *